Aug. 14, 1923.
R. A. SUMMERS
1,465,192
INDIVIDUALLY OPERABLE HEADLIGHT
Filed Dec. 14, 1921. 3 Sheets-Sheet 1
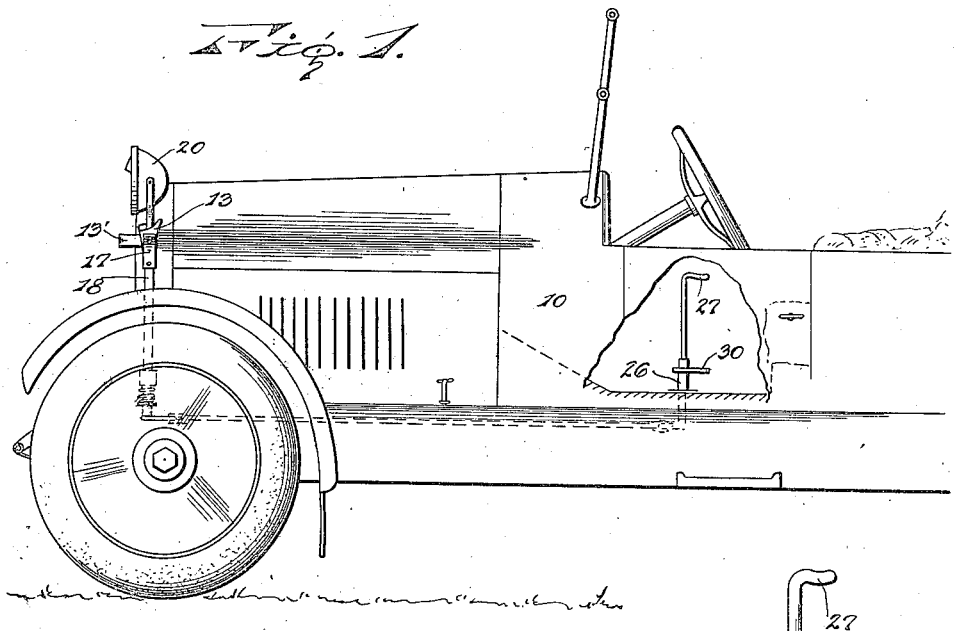
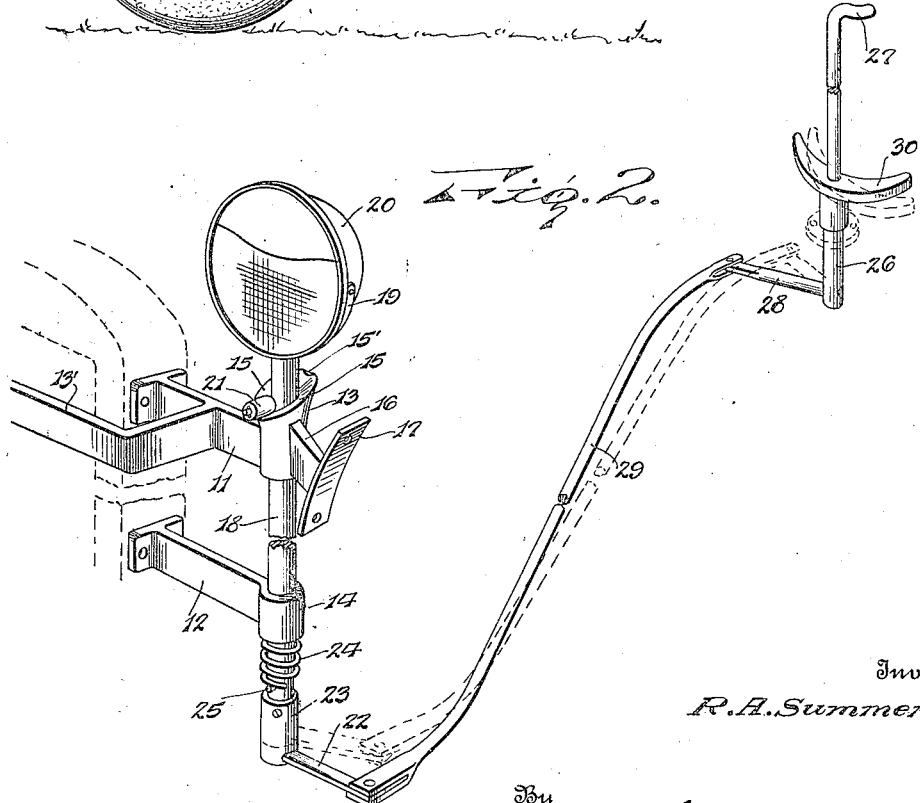
Inventor
R. A. Summers.
By Lacey & Lacey, Attorneys

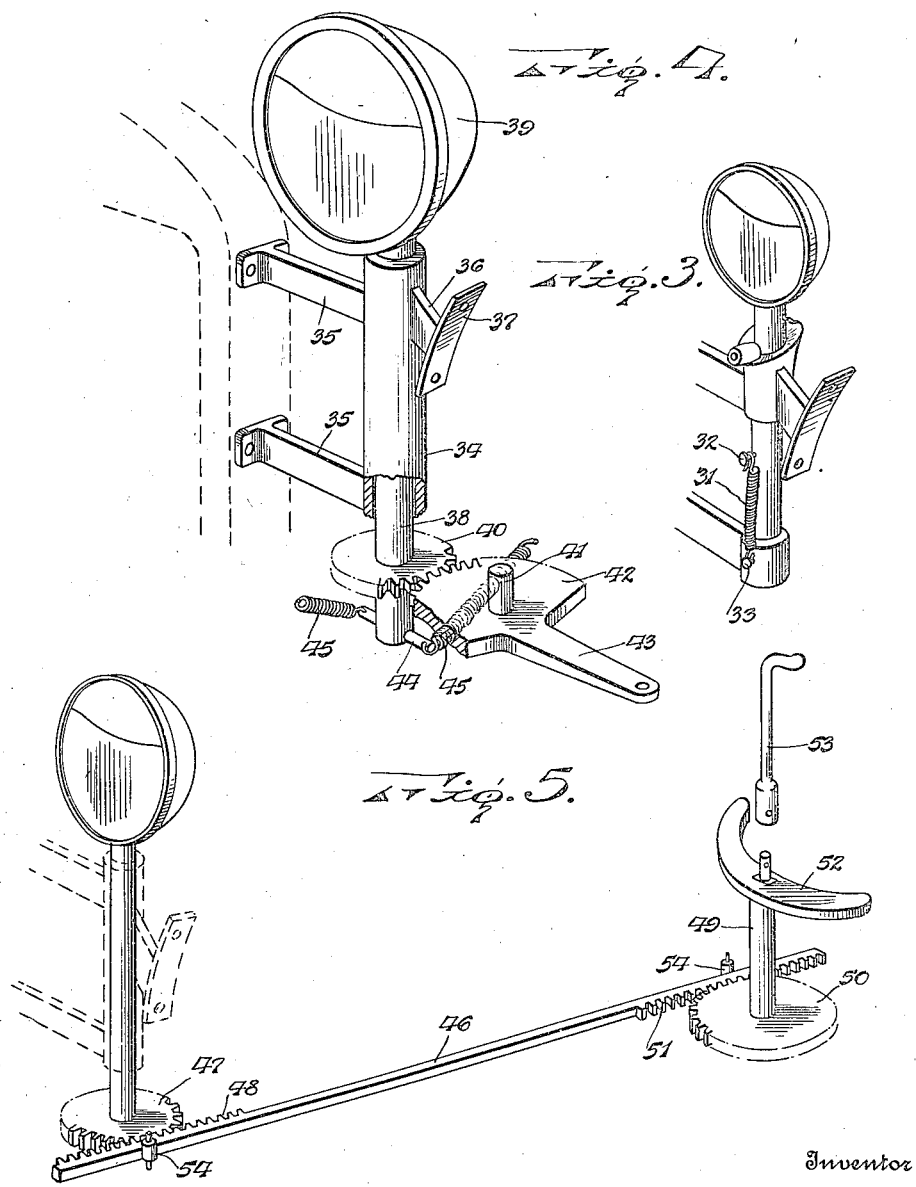

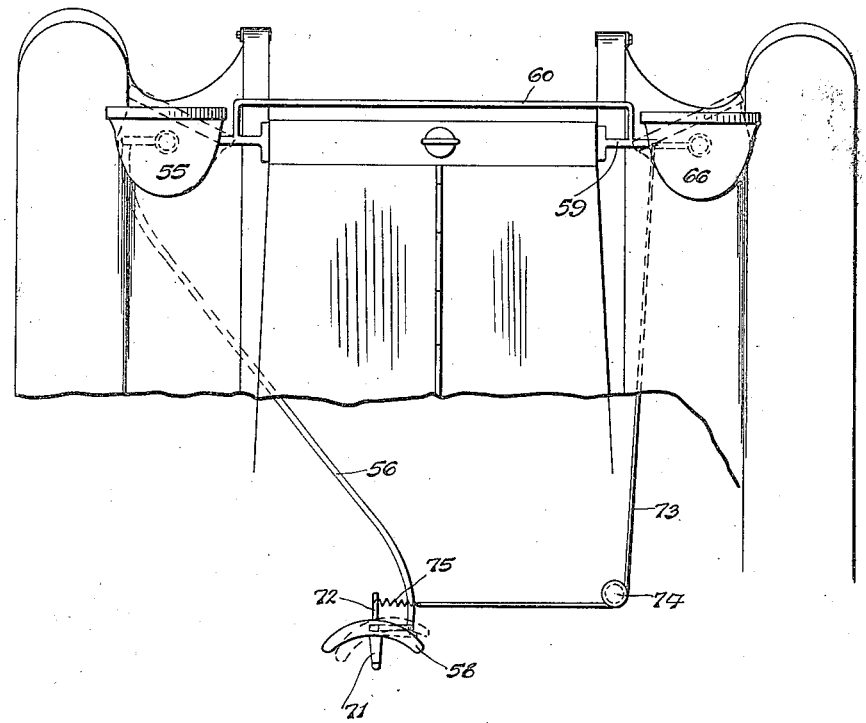
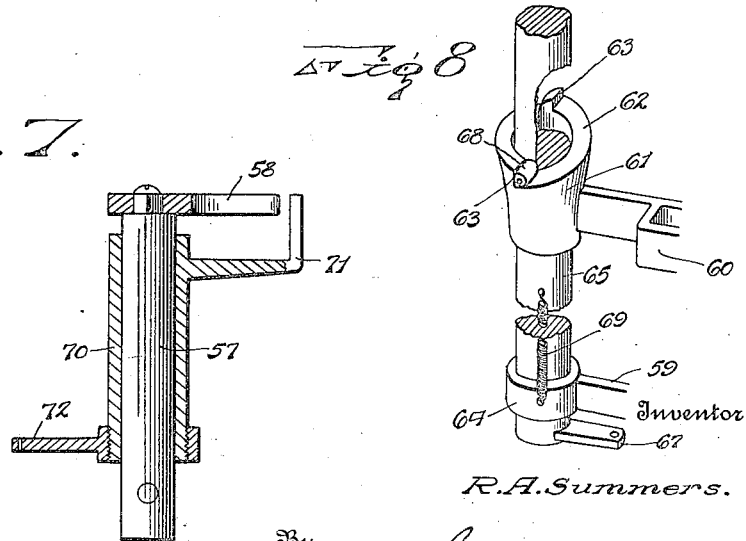

Patented Aug. 14, 1923.

1,465,192

UNITED STATES PATENT OFFICE.

RUFUS A. SUMMERS, OF MOSCOW, KANSAS.

INDIVIDUALLY-OPERABLE HEADLIGHT.

Application filed December 14, 1921. Serial No. 522,308.

*To all whom it may concern:*

Be it known that I, RUFUS A. SUMMERS, citizen of the United States, residing at Moscow, in the county of Stevens and State of Kansas, have invented certain new and useful Improvements in Individually-Operable Headlights, of which the following is a specification.

This invention relates to an improved individually operable headlight for motor vehicles and has as one of its principal objects to provide a headlight which may, without the necessity for turning a vehicle, be directed either to the right or left for illuminating a turn in a roadway or illuminating a side street.

A further object of the invention is to provide a headlight which will normally coact with a fixed headlight upon the vehicle for illuminating a roadway straight ahead.

And the invention has as a still further object to provide a headlight which, when rotated in either one direction or the other, will be automatically returned to its normal position.

Other and incidental objects will appear hereinafter.

In the drawings:

Figure 1 is a fragmentary side elevation showing my improved headlight in conjunction with a conventional motor vehicle, Figure 2 is an enlarged perspective view showing the headlight in detail, Figure 3 is a perspective view showing a slight modification of the invention, Figure 4 is a perspective view showing a further slight modification, Figure 5 is a perspective view showing a further modification, Figure 6 is a plan view showing a further modification, Figure 7 is a detail section showing the foot control employed in conjunction with the modification of Figure 6, and Figure 8 is a perspective view particularly illustrating a bearing for one of the lamp supporting shafts as employed in this latter modification.

Referring now more particularly to the drawings, I have, for convenience, shown my improved headlight in conjunction with a conventional motor vehicle 10, it being understood that the vehicle is equipped with one stationary headlight while the other conventional headlight of the vehicle is supplanted by the present invention. Secured to the automobile radiator at one side thereof or to any other appropriate part of the vehicle near its front end, are spaced brackets 11 and 12 respectively, the bracket 11 being formed at its outer end with a bearing 13 and being connected with the lamp bracket at the opposite side of the vehicle by a cross bar 13'. The bracket 12 is provided with an alined bearing 14. As particularly shown in Figure 2, the bearing 13 is flared toward its upper end and, at its upper end edge, is beveled to define a pair of inclined shoulders 15 sloping to the forward side of the bearing and providing a crotch between the lower ends thereof while between the upper ends of said shoulder is a seat 15'. Extending from the bearing in alinement with the bracket 11, is an arm 16 formed at its outer end with a plate 17 which is connected to the mud guard at the adjacent side of the vehicle for rigidly bracing the bearing.

Journaled through the bearings 13 and 14 is a vertical lamp supporting shaft 18 provided at its upper end with a fork 19 and suitably mounted in said fork is a lamp 20. Mounted upon the shaft at its forward side is a horizontally arranged roller 21 disposed to coact with the shoulders 15 of the bearing 13 and sustain the shaft against downward movement. Suitably secured to the shaft at its lower end is an arm 22 having a sleeve 23 fitting over the shaft and surrounding the shaft is a spring 24 coacting at one end with the bearing 14 and at its opposite end with a pin 25 driven through the shaft. Thus, this spring will normally force the shaft in a downward direction so as to prevent vertical vibration of the lamp 20 and will normally hold the roller 21 seated in the crotch between the shoulders 15 of the bearing 13 for normally maintaining the lamp directed forwardly. Accordingly, under ordinary circumstances, the lamp 20 will coact with the fixed headlight of the vehicle for illuminating the roadway straight ahead. Suitably journaled upon the vehicle body in front of the driver's seat is a vertically disposed control shaft 26 provided at its upper end with a handle 27 and extending from the lower end of said shaft is an arm 28. Pivotally connected at one end to this arm and at its opposite end to the arm 22 is a rod 29 and mounted upon the shaft 26 near its lower end is an arcuate foot pedal 30.

As will now be readily understood in view of the preceding description, by pressing upon one end of the pedal 30, the shaft 26 may be rotated for correspondingly rotating the lamp supporting shaft 18, say, for instance, toward the left. As the shaft 18 is thus rotated, the roller 21 will ride up a corresponding one of the shoulders 15 of the bearing 13, compressing the spring 26. Accordingly, when the foot pedal 30 is released, the shaft 18 will be counter-rotated and the lamp 20 automatically returned to its normal position directed straight ahead. By pressing against the opposite end of the foot pedal 30, the shaft 18 may be rotated a half turn in the opposite direction or toward the right, when the roller 21 will ride up the other of the shoulders 15 of the bearing 13, compressing the spring 24. Thus, when the pedal is released, the lamp will be returned to its normal position. I accordingly provide an arrangement wherein the lamp 20 may be easily operated for directing its rays either toward the right or left to illuminate a turn in the roadway or a side street, so that the danger incident to turning a vehicle out of the path of the light rays of the headlights, such as is now incident to the ordinary stationary headlights, may be avoided. By rotating the lamp a full half turn, the roller 21 may be engaged in the seat 15' for holding the lamp stationary directed rearwardly for illuminating the interior of the vehicle as well as the roadway adjacent the vehicle, so that, should it be necessary, repairs may be readily made. If desired, the handle 27 of the shaft 26 may, of course, be employed for manually turning said shaft to manipulate the headlight.

In Figure 3 of the drawings, I have illustrated a slight modification wherein, in lieu of the spring 24, a spring 31 is employed. This spring is connected at one end to a pin 32 projecting from the lamp supporting shaft and at its opposite end to a similar pin 33 projecting from the lower bearing for said shaft. The spring 31 is thus mounted to serve all of the functions of the spring 24. Otherwise, this modification is identical with the preferred construction.

In Figure 4 of the drawings, I have illustrated a further modified form of the invention. In this modification, I employ an elongated tubular bearing 34 from which extend brackets 35 for connecting the bearing with the vehicle and projecting from said bearing in alinement with the uppermost of said brackets is an arm 36 on which is formed a plate 37 disposed for attachment to an adjacent mud guard of the vehicle. Journaled through the bearing is a vertically disposed lamp supporting shaft 38 upon the upper end of which is mounted a lamp 39 and secured to the shaft near its lower end is a gear 40. Appropriately mounted to coact with said gear, as by a trunnion 41, is an oscillating gear segment 42 from which projects an arm 43 and extending through the shaft 38 below said gear is a cross rod 44 to the ends of which are connected oppositely directed springs 45. These springs may be secured to any adjacent part or parts of the vehicle and, as will at once be appreciated, serve to normally hold the shaft 38 against rotation, maintaining the lamp 39 directed straight ahead. The shaft 26 and associated parts of the preferred construction may be employed for oscillating the gear segment 42, the rod 29 being connected at its forward end to the arm 43. Thus, the shaft 38 may be turned in opposite directions for turning the lamp 39, the springs 45 serving to automatically return the shaft when released.

In Figure 5 of the drawings, I have illustrated a still further modification of the invention wherein, in lieu of the gear segment 42, as shown in the modified structure of Figure 4, I employ an actuating bar 46. Fixed to the lower end of the lamp supporting shaft is a gear 47 and formed on the adjacent end of said bar is a rack 48 coacting with said gear. A control shaft 49 is employed, this shaft corresponding to the shaft 26 of the preferred construction, and mounted on said shaft at its lower end is a gear 50 while the bar 46 is provided at its adjacent end with a rack 51 to coact with said gear. The shaft 49 carries a foot pedal 52 corresponding to the pedal 30 of the preferred construction and detachably connected to the shaft at its upper end is a handle 53 designed to serve the function of the handle 27. Thus, the shaft 49 may be turned for manipulating the headlight. As will be observed, suitably mounted rollers 54 are provided to coact with the bar 46 near its ends.

In Figures 6, 7 and 8 of the drawings, I have illustrated a further modification embodying an arrangement wherein both of the headlights of the vehicle may be simultaneously rotated in opposite directions so that the rays from the headlights will be caused to cross each other whereby, without dimming of the headlights, said headlights will be prevented from blinding an approaching motorist. Mounted at one side of the vehicle radiator is a lamp 55 identical with the lamp 20 of the preferred construction and mounted in like manner. Extending rearwardly from the supporting shaft for said lamp is a rod 56 corresponding to the rod 29, this rod being connected at its rear end with a control shaft 57 upon the upper end of which is mounted an arcuate foot pedal 58. The parts 57 and 58 correspond, of course, to the parts 26 and 30 of the preferred construction. Thus, as will be appreciated in view of the preceding description, the lamp 55 may be rotated by means of the pedal 58. Mounted at the opposite side of the vehicle radiator are vertically spaced brackets 59 the uppermost of which is connected with the uppermost of the brackets for the lamp 55 by a cross bar 60. The uppermost of the brackets 59 is provided at its outer end with a bearing 61, the upper end of which is formed to provide a substantially semi-circular inclined face 62 terminating in stop shoulders 63. The lowermost of the brackets 59 is provided at its outer end with a bearing 64 and journaled through said bearings is a lamp supporting shaft 65 equipped at its upper end with a lamp 66 while from the lower end of said shaft extends an arm 67. Projecting from the shaft at substantially right angles thereto is a roller 68 to coact with the inclined face 62 of the bearing 61, the roller being engageable with the shoulders 63 selectively for limiting the shaft in its turning movement. Thus, as will be clear, the shaft may be rotated for a half turn when the roller 68 will ride up the inclined face 62, and associated with the shaft is a spring 69 for counter-rotating the shaft to normal position. Surrounding the control shaft 57 is a tubular shaft 70, from the upper end of which extends a rearwardly projecting pedal 71 normally disposed, as shown in Figure 6, midway between the ends of the pedal 58 and extending from the lower end of said shaft is a forwardly projecting arm 72. Connected at one end to this arm and at its opposite end to the arm 67 is a cable 73 which is trained around an appropriately located pulley 74, a spring 75 being preferably employed at the rear end of the cable. As will be perceived, the pedal 58 may be engaged for individually turning the lamp 55. However, by engaging the foot with the pedal 71, this pedal may be swung to one side, as shown in dotted lines in Figure 6, to engage the adjacent end of the pedal 58, when continued swinging movement of the pedal 71 will serve to simultaneously turn both of the headlights 55 and 66 in opposite directions, as illustrated in dotted lines, so that the rays from the headlights will be caused to cross each other. Thus, the headlights will be prevented from blinding an approaching motorist.

Having thus described the invention, what is claimed as new is:

1. A headlight mechanism including rotatable lamp supporting shafts, means for rotating one shaft independently of the other shaft, and means engageable with the first-mentioned means whereby both shafts may be rotated simultaneously toward each other.

2. A headlight mechanism including rotatable lamp supporting shafts, a foot operated shaft operatively connected with one of said lamp supporting shafts, a foot pedal on the latter shaft engageable for rotating said lamp supporting shaft, a tubular shaft rotatable on said last mentioned shaft and operatively connected with the other of said lamp supporting shafts, and a foot pedal upon said tubular shaft for rotating said last mentioned lamp supporting shaft and engageable with said first mentioned foot pedal whereby both of said lamp supporting shafts may be rotated simultaneously.

3. In a headlight mechanism, the combination of companion vertically spaced supporting brackets having alined bearings one provided with an inclined face, a lamp supporting shaft journaled through said bearings and provided with means to coact with said inclined face for counter-rotating the shaft when turned in either direction, a spring coacting between the shaft and the other of said bearings resisting rotation of the shaft, and manually operable means for rotating the shaft.

In testimony whereof I affix my signature.

RUFUS A. SUMMERS. [L. S.]